(12) United States Patent
Richardson et al.

(10) Patent No.: US 9,290,849 B2
(45) Date of Patent: Mar. 22, 2016

(54) CORROSION CONTROL METHODS

(71) Applicant: CHEMTREAT, INC., Glen Allen, VA (US)

(72) Inventors: John Richardson, Hanover, VA (US); Rajendra Kalakodimi, Richmond, VA (US); DeAnn Wills-Guy, Richmond, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 16 days.

(21) Appl. No.: 14/316,411

(22) Filed: Jun. 26, 2014

(65) Prior Publication Data

US 2015/0004054 A1    Jan. 1, 2015

Related U.S. Application Data

(60) Provisional application No. 61/839,848, filed on Jun. 26, 2013.

(51) Int. Cl.
| | |
|---|---|
| *C23F 11/00* | (2006.01) |
| *C23F 11/18* | (2006.01) |
| *G05B 1/00* | (2006.01) |
| *B08B 9/00* | (2006.01) |
| *B08B 9/04* | (2006.01) |

(Continued)

(52) U.S. Cl.
CPC . *C23F 11/00* (2013.01); *C02F 1/68* (2013.01); *C02F 1/683* (2013.01); *C02F 1/70* (2013.01); *C02F 5/083* (2013.01); *C23F 11/18* (2013.01); *C02F 2101/203* (2013.01); *C02F 2103/023* (2013.01); *C02F 2303/08* (2013.01)

(58) Field of Classification Search
CPC ..................................... A61L 2/00; C02F 5/00
USPC ................ 422/3, 7, 14–19, 105; 134/8, 22.1, 134/22.11, 22.14; 252/175
See application file for complete search history.

(56) References Cited

U.S. PATENT DOCUMENTS

| | | |
|---|---|---|
| 5,202,058 A | 4/1993 | Riggs, Jr. |
| 6,001,156 A | 12/1999 | Riggs, Jr. |
| 6,200,529 B1 | 3/2001 | Riggs, Jr. |
| 7,910,024 B2 | 3/2011 | Stapp et al. |
| 2006/0118761 A1* | 6/2006 | Stapp .................. C02F 5/08 252/175 |

OTHER PUBLICATIONS

Jul. 21, 2015 Written Opinion issued in PCT/US2014/044391.

(Continued)

*Primary Examiner* — Monzer R Chorbaji
(74) *Attorney, Agent, or Firm* — Oliff PLC

(57) ABSTRACT

There are provided methods of suppressing corrosion of a corrodible metal surface that contacts a water stream in a water system, the method comprising: (a) introducing into the water stream a shot dose of a treatment composition comprising a corrosion inhibitor, the shot dose being introduced into the water stream over a first time period and the water stream having a first concentration of corrosion inhibitor during the first time period; (b) then reducing the amount of treatment composition that is introduced into the water stream; and (c) after the first time period, maintaining a second concentration of corrosion inhibitor in the water stream over a second time period, the second concentration being less than 25% of the concentration of corrosion inhibitor during the first time period. There is also provided, after the second time period, introducing into the water stream a second shot dose of the corrosion inhibitor, the second shot dose being introduced into the water stream over a third time period, the third concentration being greater than the second concentration.

41 Claims, 6 Drawing Sheets

(51) Int. Cl.
*C02F 5/02* (2006.01)
*C02F 1/68* (2006.01)
*C02F 1/70* (2006.01)
*C02F 5/08* (2006.01)
*C02F 101/20* (2006.01)
*C02F 103/02* (2006.01)

(56) References Cited

OTHER PUBLICATIONS

Oct. 7, 2014 International Search Report and Written Opinion issued in PCT/US2014/044391.

* cited by examiner

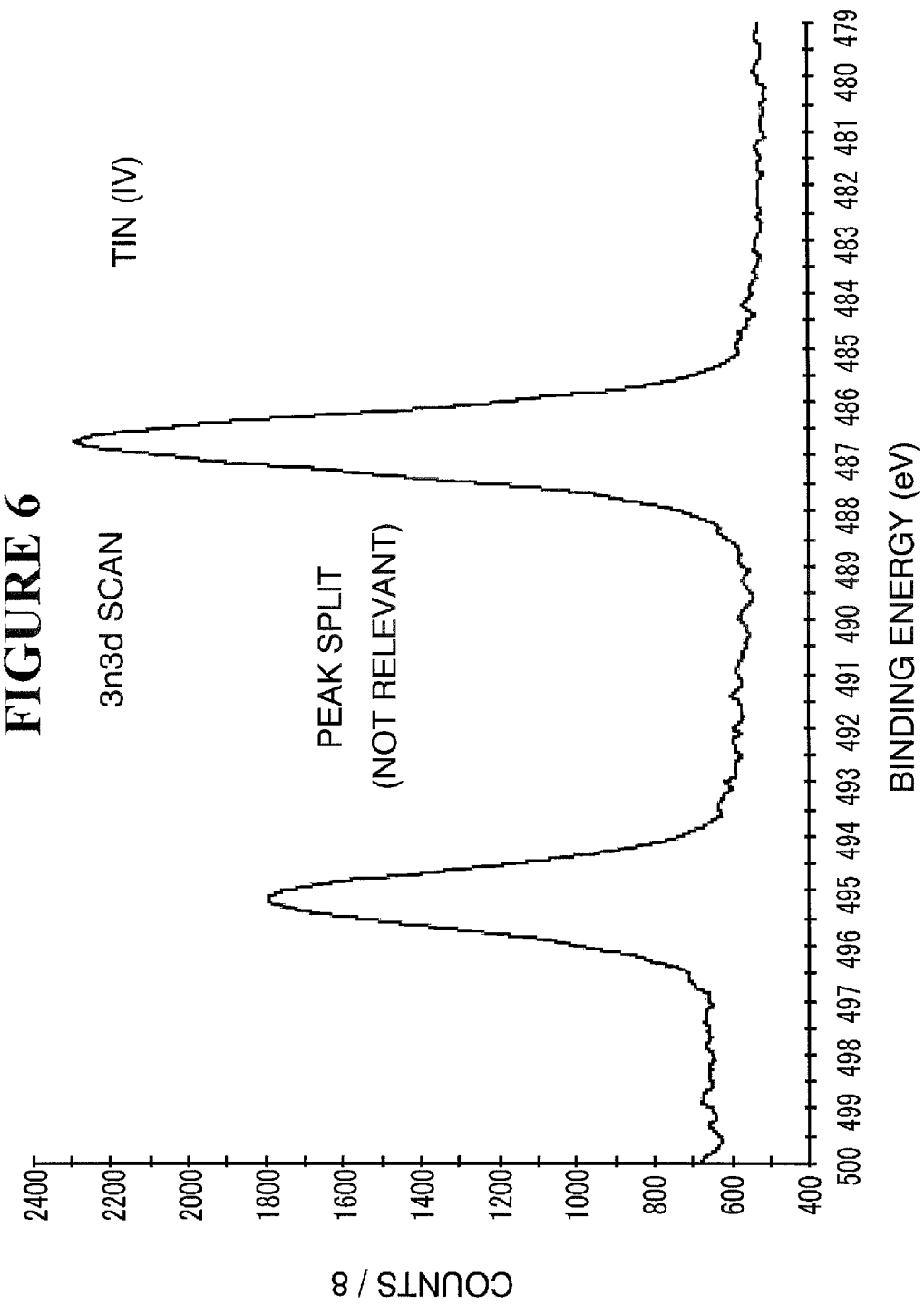

CORROSION CONTROL METHODS

This application claims the benefit of U.S. Provisional Application 61/839,848, filed Jun. 26, 2013. The disclosure of the prior application is hereby incorporated by reference herein in its entirety.

TECHNICAL FIELD

This application is directed to methods for corrosion inhibitor treatment in water systems, such as those used in industrial processes.

BACKGROUND

Treatment of corrosion in water systems is typically achieved by continuous application of various corrosion inhibitors in the water including, for example, phosphates, polymer, chromates, zinc, molybdates, nitrites, and combinations thereof. These inhibitors work by the principle of shifting the electrochemical corrosion potential of the corroding metal in the positive direction indicating the retardation of the anodic process (anodic control), or displacement in the negative direction indicating mainly retardation of the cathodic process (cathodic control). Corrosion inhibitors act on the cathode and/or anode of the corrosion cell.

A common and practical approach of corrosion protection is by changing the environment around the metal surfaces. Due to this reason, in conventional anti-corrosion treatment programs, continuous treatment of corrosion inhibitors is applied. The mechanism of corrosion inhibition was thought to require a continuous dose because of the equilibrium nature of the inhibitor film. If the maintenance dose of the inhibitor is interrupted, corrosion rates tend to increase quite quickly as the inhibitor film needs continuous replenishment. In the absence of any inhibitor, the film deteriorates rapidly. However, applying continuous inhibitors at high levels is associated with a high cost and can be particularly cost prohibitive in those instances in which the volume of water consumption is high. Continuous treatment methods also impact the effluent stream of the treated water systems and can result in toxicity issues, environmental concerns and/or additional costs associated with remedial treatment or enhanced handling of the effluent stream.

Historically, the use of Tin compounds as a corrosion inhibitor has been the subject of some experimentation in water systems like those described above. Stannous salts are known to inhibit corrosion but, unlike more conventional corrosion inhibitors, the mechanism by which the stannous salts inhibited corrosion was not well understood. Previous corrosion inhibition programs utilized the stannous salts in much the same manner as conventional corrosion inhibitors in which a maintenance dose of the stannous inhibitors were introduced into the aqueous systems to continuously maintain a minimum stannous concentration in order to be effective. Examples of such prior art methods may be found in, for example, U.S. Pat. No. 7,910,024 to Stapp et al. and U.S. Pat. Nos. 6,001,156 and 6,200,529 to Riggs, Jr., the contents of which are incorporated herein by reference, in their entireties.

Moreover, conventional corrosion inhibition practices with Tin compounds have not been able to effectively deal with the problem of maintaining an effective amount of Tin(II) in solution long enough to form a protective film on the surface of the corrosive metal without losing active form, Tin (II), due to bulk phase oxidation and precipitation to Tin (IV). These and other issues are addressed by the present disclosure. It is an object of this disclosure to provide methods for improved and effective use of Tin-based corrosion inhibitors by proposing a shot feed concept of applying corrosion inhibitor for a short period of time to form a stable and persistent film of Tin (IV) on the metal surface. This film of Tin (IV) is shown to last a few days without any more inhibitor present and the film is also shown to last much longer with a very small service dose of corrosion inhibitor.

SUMMARY

In a first embodiment, there is provided a method of suppressing corrosion of a corrodible metal surface that contacts a water stream in a water system, the method comprising: (a) introducing into the water stream a shot dose of a treatment composition comprising a corrosion inhibitor, the shot dose being introduced into the water stream over a first time period and the water stream having a first concentration of corrosion inhibitor during the first time period; (b) then reducing the amount of treatment composition that is introduced into the water stream; and (c) after the first time period, maintaining a second concentration of corrosion inhibitor in the water stream over a second time period, the second concentration being less than 25% of the concentration of corrosion inhibitor during the first time period.

In a second embodiment, there is provided a method of suppressing corrosion of a corrodible metal surface that contacts a water stream in a water system, the method comprising: (a) introducing into the water stream a first shot dose of corrosion inhibitor, the first shot dose being introduced into the water stream over a first time period and the water stream having a first concentration of corrosion inhibitor during the first time period; (b) after the first time period, maintaining a second concentration of corrosion inhibitor in the water stream over a second time period, the second concentration being less than 25% of the concentration of corrosion inhibitor during the first time period; and (c) after the second time period, introducing into the water stream a second shot dose of the corrosion inhibitor, the second shot dose being introduced into the water stream over a third time period, the third concentration being greater than the second concentration.

BRIEF DESCRIPTION OF THE DRAWINGS

FIG. 6 is an x-ray photoelectron spectroscopic image of a scanned mild steel coupon sample treated with a shot dose of corrosion inhibitor.

DETAILED DESCRIPTION

Figure 1:
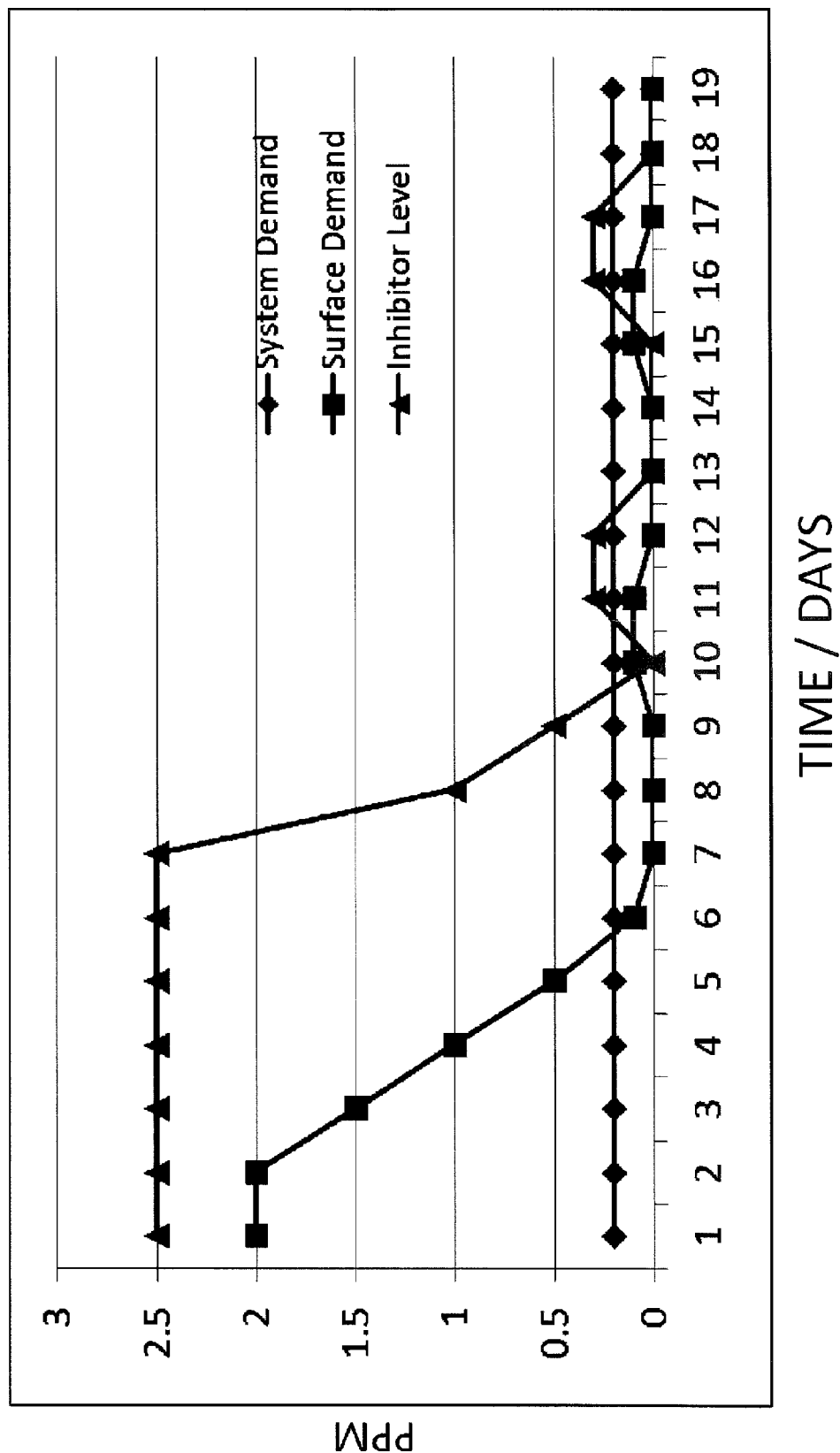
FIG. 1 is a graph illustrating the systems requirements of corrosion inhibitor and feeding of a corrosion inhibitor by shot dosing and service dosing according to an embodiment.

Embodiments of the disclosed methods apply the discovery of improved corrosion inhibition to water systems including, but not limited to cooling towers, water distribution systems, boilers, water and brine carrying pipelines, storage tanks and the like. Embodiments of the methods are particularly useful with cooling towers in industrial water processes. Improved corrosion inhibition can be achieved at lower cost and with less environmental impact by feeding corrosion inhibitors in an intermittent manner. Both the embodiments of the disclosed method forms a very tenacious and persistent inhibitor film on the surface of corrodible metal by shot feeding a corrosion inhibitor (i.e., delivering a higher dose than the regular application rate initially and/or intermittently) for a short period of time. Subsequent shot feeding, also can be termed as service dosing, is then carried out at intermittent intervals to meet the system and metal surface demands and to maintain the stable inhibitor film on the metal surface. As explained below, the shot and service intermittent feeding methods are particularly useful for stannous corrosion inhibitors.

These intermittent feed methods can result in a significant reduction in the amount of corrosion inhibitor required, which is beneficial for the environment and reduces the cost of treatment. The intermittent feed methods can also provide for more economical treatment of large volume systems including, for example, once-through applications and other systems in which the water consumption and losses pose a significant challenge for dosage and control using conventional anti-corrosion treatments. Shot and service intermittent feeding also greatly reduces the amount of corrosion inhibitor(s), such as stannous salts, required to protect the treated system by reducing consumptive losses associated with oxidation and discharge of water from the system.

The intermittent feed method embodiments using stannous inhibitors are also beneficial if the effluent from the treated system is being used in a manner or for a purpose where a conventional inhibitor would be regarded as a contaminant or otherwise detrimental to the intended use. Such stannous-based corrosion inhibitors are more tolerant of overdosing when compared to conventional zinc or phosphate programs which rely on polymeric dispersants to suppress formation of unwanted deposits.

Other reactive metal salts, for example, zirconium and/or titanium metal salts, may also be used in intermittent feed methods according to the present disclosure. Indeed, embodiments of the disclosed methods should be operable with any metal salt capable of forming stable metal oxides resistant to dissolution under the conditions in the targeted system.

Metals particularly suitable for use with the disclosed methods are multivalent, e.g., are found in at least two different oxidation states, $M^{X+}$ and $M^{Y+}$, in which the lower oxidation state metal ion, such as Tin(II), is more soluble in aqueous solutions than a higher oxidation state metal ion, such as Tin(IV). For such metals, the lower oxidation state species can be introduced into the treated system by, for example, introducing a metal salt directly or by feeding a concentrated solution into the treated system. It is believed that the stannous compounds can undergo oxidation at the vulnerable metal surfaces, i.e., those surfaces in need of corrosion protection, and form an insoluble protective film. These metal surfaces can also react with the stannous compounds to form metal-tin complexes, which again form protective films on the metal surface.

Without intending to be bound by theory, stannous inhibitors applied in accordance with the disclosed methods appear to form a protective film on reactive metals by at least three mechanisms.

A first mechanism involves forming an insoluble stannous hydroxide layer under the alkaline conditions at the cathode. This stannous hydroxide appears to oxidize further to form a stannate oxide layer, which is even more insoluble, resulting in a protective film which is resistant to dissolution from the surface even in the absence of stannous salts in the process water.

A second mechanism may be achieved under acidic conditions or in the presence of surface oxidants, for example, ferric or cupric ions, whereby the stannous salts can be directly oxidized to highly insoluble stannate salts. These stannate salts then precipitate onto the metal surface(s) to form a protective layer and provide the desired corrosion inhibition function.

A third mechanism may be achieved under alkaline conditions whereby existing metal oxides are reduced to more stable reduced forms that incorporate insoluble stannate salts in a hybrid film.

In each of these mechanisms, the final result is a stannate film, Tin (IV), formed on or at the metal surface. The insolubility and stability of the resulting stannate film provides an effective barrier to corrosion for a limited time period even in the absence of additional stannous species being provided in the aqueous component of the treated system.

The method and manner by which a corrosion treatment is infused into a water stream is not particularly limited by this disclosure. Treatment can be infused into the water system at a cooling tower, for example, or any suitable location of the water stream in the water system. Methods for infusing the corrosion treatment, including controlling the flow of the infusion, may include a multi-valve system or the like, as would be understood by one of ordinary skill in the art. Moreover control of the treatment while in the system is not particularly limited. Infusion control, including frequency, duration, concentrations, dosing amounts, dosing types and the like, may be controlled manually or automatically through, for example, an algorithm or a computer executable medium, such as a CPU. These controls may further be implemented with data and history-driven learning capabilities and feedback loops for automatically adapting shot and service dose regimens to system and metallic surface environmental conditions.

The treatment may stay in the system for a full cycle (i.e., through a heat exchanger, etc.) or several cycles, and is then gradually removed from the system with the process water in the system, for example, through known blowdown removal techniques in the case of a cooling water. Corrosion inhibitors are consumed within a treated system in various ways. These consumption pathways can be categorized as system demand and surface demand. Together, system demand and surface demand comprise total inhibitor demand.

System demand, in many scenarios, is attributed to the presence of oxygen, halogens, other oxidizing species and other components in the aqueous system that can react with or remove, and thereby deactivate or consume, the inhibitor. With stannous salt treatments, for example, oxidizing species can convert the preferred Tin(II) stannous ions to largely ineffective (at least in the process water stream) Tin(IV) stannate ions. System demand also includes inhibitor losses associated with bulk water loss through, for example, blowdown and/or other discharges from the treated system. System demand does not, however, include inhibitor that binds to or otherwise reacts with the wetted metal surfaces.

Surface demand is the consumption of the inhibitor attributed to the interaction between the inhibitor and a reactive metal surface. Surface demand will decline as the inhibitor forms a protective film or layer on those metal surfaces that were vulnerable to corrosion. Once all of the wetted surfaces have been adequately protected, the surface demand will be nothing or almost nothing. Because the intermittent feed methods according to embodiments focus on treating the metal rather than treating the water, once the surface demand is reduced to values close to zero, the inhibitor feed amount can be substantially reduced or even terminated for some period of time without compromising the effectiveness of the corrosion inhibition program.

In a first embodiment, there is provided a method of suppressing corrosion of a corrodible metal surface that contacts a water stream in a water system, the method comprising: (a) introducing into the water stream a shot dose of a treatment composition comprising a corrosion inhibitor, the shot dose being introduced into the water stream over a first time period and the water stream having a first concentration of corrosion inhibitor during the first time period; (b) then reducing the amount of treatment composition that is introduced into the water stream; and (c) after the first time period, maintaining a second concentration of corrosion inhibitor in the water stream over a second time period, the second concentration being less than 25% of the concentration of corrosion inhibitor during the first time period.

The corrodible metal surface may be a metal or alloy selected from the group consisting of ferrous metals, aluminum metals, brass, copper containing alloys, and galvanized steels.

Figure 2:
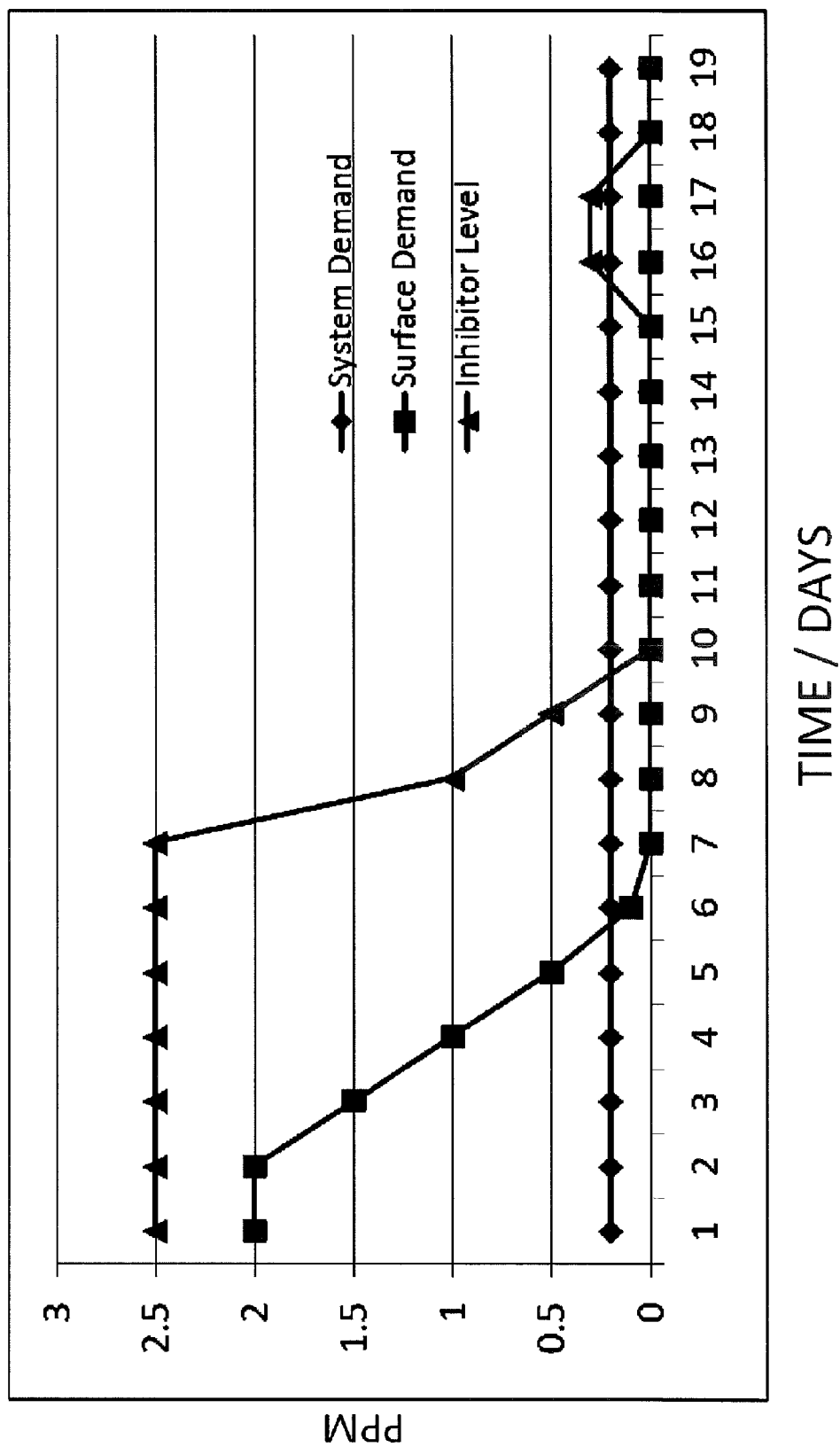
FIG. 2 is a graph illustrating the systems requirements of corrosion inhibitor and feeding of a corrosion inhibitor by shot dosing and service dosing according to an embodiment.

Depending on the particular system, the feeding can be implemented in several ways. In this embodiment, as shown in FIGS. 1 and 2, the treatment is first shot-dosed through a "slug" or "pulse" comprising a much higher concentration during a first time period than in subsequent feedings. The effect of the slug or shot dose period is shown in FIGS. 1 and 2 at days 1-7 where the concentration of inhibitor is highest. In some embodiments, the effect of the first dosing period can last anywhere in the range of from 2 hours to 2 days, from 4 hours to 24 hours, for example. The effectiveness of the shot dose treatment will be a function of the duration of the feeding and concentration of the shot dose. As such, controlling these factors is important in arriving at the optimal dosing plan for a particular system. The duration of the slug or shot dose period can range from 5 minutes to 2 days, or more preferably, from 10 minutes to 24 hours.

The amount of the initial shot can be applied based on the system demand and surface demand for the inhibitor. Controlling the shot dose can utilize a number of parameters associated with surface and system demands including, for example, the concentration of corrosion products in the water or the demand of a surface of the metal for reduction species. Other parameters such as on-line corrosion rates and/or oxidation reduction potential (ORP) may also be used for controlling the shot dose frequency or monitoring system performance.

The shot dose treatment may include, in addition to the corrosion inhibitor or a salt thereof, such as Tin(II)/stannous chloride or the like, many other materials. For example, the treatment may comprise, at least one of citric acid, benzotriazole and 2-Butenedioic acid (Z), bicarbonates for increasing the alkalinity of the solution, a polymeric dispersant, such as 2-acrylamido-2-methylpropane sulfonic acid (AMPS), for inhibiting silt or fouling, and polymaleic acid (PMA) for inhibiting scaling. The treatment may include, for example, ChemTreat FlexPro™ CL5632, manufactured by ChemTreat, Inc., or the like.

Figure 3:
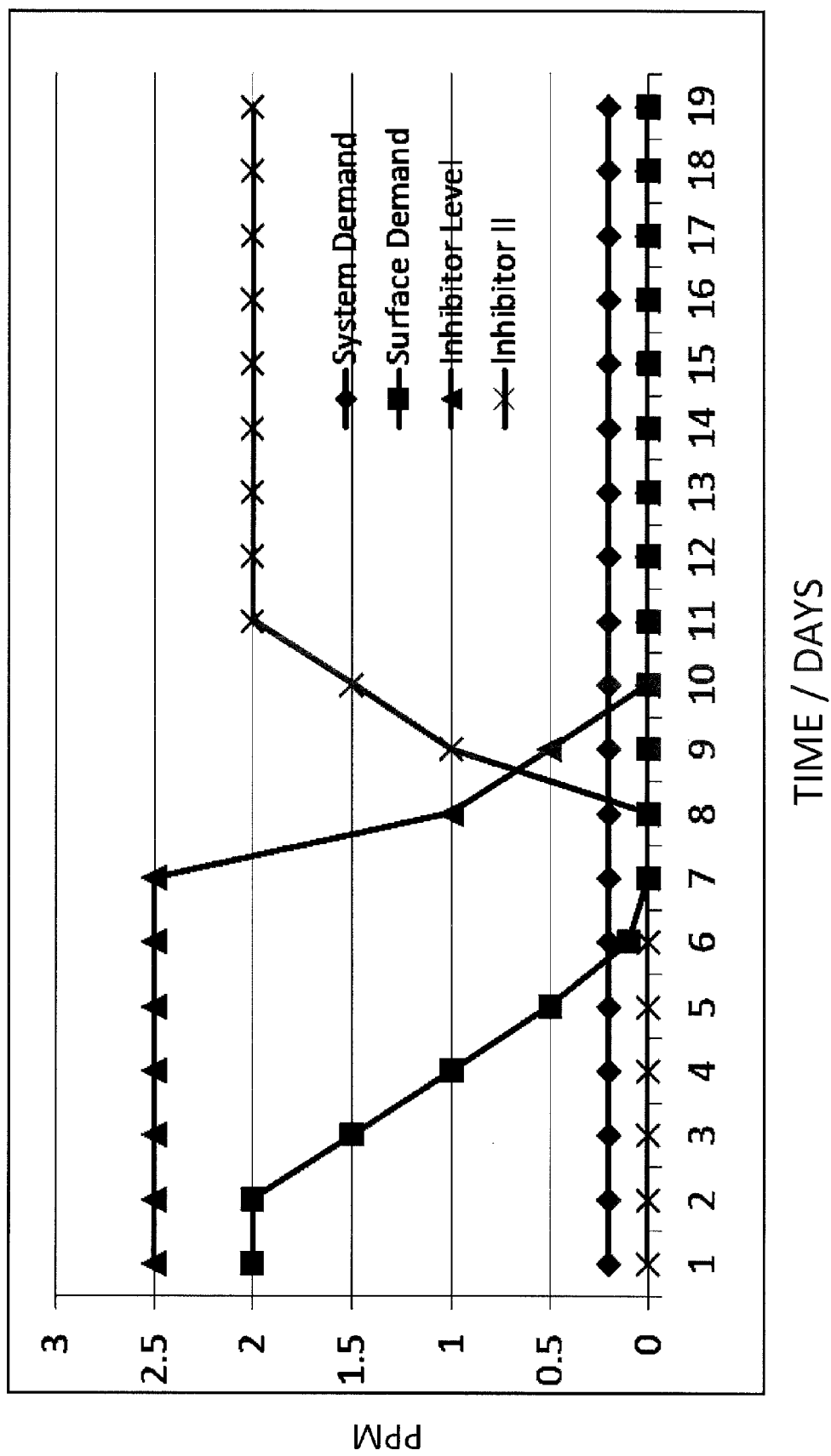
FIG. 3 is a graph illustrating the systems requirements of corrosion inhibitor and feeding of two corrosion inhibitors by shot dosing according to an embodiment.

FIGS. 1-3 illustrate a unique phenomenon of the shot dose method. As shown in FIGS. 1-3, the system demand for the corrosion inhibitor remains relatively constant over the course of 19 days. During the shot dose cycle (days 1-7), the surface demand for the inhibitor drops precipitously from days 2-6. This is due to the formation of the Tin(IV) layer on the surface of the metal, which decreases the surface's overall demand for additional inhibitor (Tin(II)).

According to this embodiment, the concentration of the treatment in the process water stream during the shot dose period may be from about 50 ppm to 500 ppm. The concentration of the treatment during the shot dose period is preferably from about 100 ppm to 300 ppm, or more preferably, about 200 ppm. The concentration of the active corrosion inhibitor component (e.g., Tin(II)) in the process water stream during the shot dose period may be from about 0.1 to 1000 ppm, about 0.2 ppm to 50 ppm, or about 0.5 to 10 ppm. A stannous treatment concentration of, for example, 1-10 ppm would be expected to suffice for a typical cooling water system. The concentration of the active corrosion inhibitor is preferably from about 0.2 ppm to 20 ppm, 0.1 ppm to 10 ppm, or more preferably, from about 1.5 ppm to 5 ppm, and most preferably about 3 ppm.

At the early stages of the treatment in a system with existing corrosion and/or exposed metal surfaces, the total inhibitor demand will be high but will decrease as metal surfaces are passivated by the inhibitor treatment. A treatment end point is reached where all surfaces are passivated and only the system (non-metal surface) demand remains. Once effective passivation is achieved using the treatment period(s), the system can be operated for extended periods without the need for any further addition of corrosion inhibitor or with a substantially reduced level of corrosion inhibitor.

Corrosion in the water system may further be treated by applying at least one maintenance or service dose during a second, third, fourth, etc. time period, and preferably periodic recurring service doses, of the treatment comprising the corrosion inhibitor. The service dose can occur with or immediately after the shot dose or can be applied only after the surface demand increases, e.g., 2-30 days after the shot dose. For example, as shown in FIG. 1, the service dose is applied at days 10 and 15 and, as shown in FIG. 2, the service dose is applied at day 15. Depending on the system, treatment with the service dose can maintain effective corrosion levels when the period between the service doses is in the range of from about 2 to 20 days per dose, preferably 2 to 10 days per dose, or more preferably from 3 to 8 days.

FIG. 1 illustrates a unique phenomenon of the shot-dose and subsequent service dose methods. As shown in FIG. 1, as the surface demand for the inhibitor begins to increase at day 10 (and again at day 15), the low-concentration service dose is increased in response to the increase in surface demand. In this manner, the service dose regimen is controlled according to the monitored and detected surface demand. FIG. 2 illustrates a preventative service dose application. As shown in FIG. 2, it may be beneficial to increase the concentration of the service dose (see day 16) even in the absence of a rise in surface demand in order to proactively address corrosion. In some cases, depending on the severity of the corrosive species in the water, the concentration of the service dose could be equal to or greater than the initial shot feed concentration.

The effectiveness of the service dose treatment will be a function of duration of the feeding and concentration of the shot dose. The service dose treatment may have the same make-up as the shot dose. Alternatively, the treatment composition in the service dose can have a different composition than that used in the shot dose. As discussed in greater detail below, in the case of stannous inhibitors, it may be preferable to include a reducing agent in the service dose for keeping Tin in active Tin (II) form for long periods of time, even though the reducing agent may or may not be desirable to use in the initial shot dose. The service dose method is a reactive method whereby after an initial inhibitor treatment (the shot dose) is successful in reducing the surface demand, subsequent "slugs" or "pulses" of the inhibitor are fed into the system. The service doses can be fed into the system at timings based on an increase in the surface demand of the treated metal surface. The concentration of the inhibitor achieved during the intermittent service feed dose period must be sufficient to exceed the baseline system demand and thereby ensure that a portion of the inhibitor fed is available to treat the vulnerable metal surfaces.

The amount of the service dose, like the shot dose, can be applied based on the surface demand for the inhibitor. Controlling the service dose based on the surface demand can utilize a number of parameters associated with surface demand including, for example, the concentration of corrosive species in the water or the demand of a surface of the metal for reduction species. Other parameters such as on-line corrosion rates and/or oxidation reduction potential (ORP) may also be used for controlling the service dose or monitoring system performance.

Preferably, the frequency or time between service doses may be from about 2 to 30 days, or preferably 3 to 7 days. More preferably, the time between service doses is about 7 days. In some systems, it may be beneficial to maintain some continuous level of active corrosion inhibitor in the water process stream after the initial shot period, e.g., from about 0.05 to 10 ppm, from about 0.05 to 5 ppm, from about 0.1 to 2 ppm or from about 0.1 to 0.5 ppm. Maintaining a continuous low to very low level of active corrosion inhibitor after the initial shot dosing may reduce the frequency at which subsequent service dosing periods are needed. The continuous service dose may be infused uninterruptedly for 1 to 30 days, or 5 to 20 days. More preferably, the continuous service dose is about 10 days. The second concentration of corrosion inhibitor in the service does may be zero or substantially zero. The duration, timing and concentration of the doses can vary with the system demand as described herein.

In this embodiment, the second time period may be shorter than the first time period and the second concentration of corrosion inhibitor may be zero or substantially zero. The second concentration of corrosion inhibitor may be from 5 to 25% of the first concentration of corrosion inhibitor. The second concentration of corrosion inhibitor may be from 10 to 20% of the first concentration of corrosion inhibitor. The second concentration of corrosion inhibitor may be in the range of from about 0.05 ppm to 10 ppm. The second concentration of corrosion inhibitor may be in the range of from about 0.1 to 3 ppm.

The intermittent service dose regimen may comprise as many service doses (cycles) as required by the system before a given endpoint such as, for example, when the surface demand is zero or substantially zero or when salination in the water system reaches a threshold level requiring the removal of blowdown, and a return to the shot dose is required. The number of service dose cycles is not particularly limited and may be from 1 to 10 cycles, or preferably from 2-5. More preferably, the number of cycles is about 2-3. The duration, timing and concentration of the doses can vary from cycle to cycle as described herein. The time between the periodic and intermittent shot doses is from about 1 to 30 days, or more preferably, from about 3 to 7 days.

In a second embodiment, there is provided a method of suppressing corrosion of a corrodible metal surface that contacts a water stream in a water system, the method comprising: (a) introducing into the water stream a first shot dose of corrosion inhibitor, the first shot dose being introduced into the water stream over a first time period and the water stream having a first concentration of corrosion inhibitor during the first time period; (b) after the first time period, maintaining a second concentration of corrosion inhibitor in the water stream over a second time period, the second concentration being less than 25% of the concentration of corrosion inhibitor during the first time period; and (c) after the second time period, introducing into the water stream a second shot dose of the corrosion inhibitor, the second shot dose being introduced into the water stream over a third time period, the third concentration being greater than the second concentration.

In this embodiment, after the second time period, a second shot dose of the corrosion inhibitor may be introduced into the water stream. The second shot dose being introduced into the water stream over a third time period, the third concentration being greater than the second concentration and equal to or less than the first concentration. The third time period may be shorter than the first time period. The third concentration of corrosion inhibitor may be from 5 to 100% of the first concentration of first shot dose. The third concentration of corrosion inhibitor may be from 10 to 20% of the first concentration of corrosion inhibitor. The third concentration of corrosion inhibitor may be in the range of from about 0.1 to 1000 ppm, about 0.5 to 50 ppm or about 1.5 to 5.

As will be appreciated, the frequency of the service dose feedings and the inhibitor concentration necessarily will be a function of the system being treated and can be set and/or adjusted empirically based on test or historical data. As with the shot feeding embodiment, the concentration of the inhibitor achieved during the service feeding must be sufficient to exceed the baseline system demand and thereby ensure that a portion of the inhibitor fed is available to treat the vulnerable metal surfaces.

The success of the service feeding technique may be evaluated by monitoring the total inhibitor demand which, when the surface demand is effectively suppressed or eliminated, will be essentially equal to the system demand. The system demand, in turn, can be measured indirectly by monitoring parameters such as ORP and oxygenation levels. Thus, according to one embodiment, the treatment method may further comprise measuring and monitoring a characteristic of the metal surface or water stream particularly after the shot dose, or between each successive service dose, to determine a time to initiate the service dose of the treatment comprising the corrosion inhibitor, and/or a concentration of the inhibitor in the service dose.

In this embodiment, the timing of introducing the service dose is controlled based on the measured parameter, and the concentration of the corrosion inhibitor in the water stream during the second time period is less than the concentration of the corrosion inhibitor in the water stream during the first period. The timing of introducing the service dose is controlled based on the measured parameter, and the concentration of the corrosion inhibitor in the water stream during the second time period is less than the concentration of the corrosion inhibitor in the water stream during the first period. The measured parameter may be indicative of a surface demand of the metal surface for the corrosion inhibitor. The duration of the second time period is controlled based on the measured parameter. The duration of the first time period is controlled based on the measured parameter. The measured parameter may indicative of a corrosion rate of the metal surface. The measured parameter may be indicative of a concentration of an oxidizing species in the water system.

If desired, additional corrosion inhibition and/or water treatment chemistry known in the art can be introduced into the system in conjunction with the shot dosing to further improve corrosion performance and control deposition of undesirable species. As will be appreciated, the intermittent feeding methods according to the disclosure can be paired with other treatment or conditioning chemistries that would be compromised by the continuous presence of the corrosion inhibitor. Alternatively, "greener" treatment packages or treatment packages designed to address other parameters of the system operation can be utilized between the intermittent feedings to improve the quality of the system effluent and/or reduce the need for effluent treatment prior to discharge.

According to one embodiment, reducing agents may only be infused with treatments during service dosing, as this has been found to be most effective. Controlling the amount of reducing agent, including frequency, duration and concentration, according to methods described herein, may lead to more effective corrosion inhibition methods. It is contemplated that reducing agents may also be used in shot dosing.

The corrosion treatment composition can include adding stannous in conjunction with one or more components including, for example, unsaturated carboxylic acid polymers such as polyacrylic acid, homo or co-polymaleic acid (synthesized from solvent and aqueous routes); acrylate/2-acrylamido-2-methylpropane sulfonic acid (AMPS) copolymers, acrylate/acrylamide copolymers, acrylate homopolymers, terpolymers of carboxylate/sulfonate/maleate, terpolymers of acrylic acid/AMPS; phosphonates and phosphinates such as 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxyphosphonocarboxylic acid (HPA), diethylenetriamine penta(methylene phosphonic acid) (DETPMP), phosphinosuccinic oligomer (PSO); salts of molybdenum and tungsten including, for example, nitrates and nitrites; amines such as N,N-diethylhydroxylamine (DEHA), diethyl amino ethanol (DEAE), dimethylethanolamine (DMAE), cyclohexylamine, morpholine, monoethanolamine (MEA); azoles such as tolyltriazole (TTA), benzotriazole (BZT), butylbenzotriazole (BBT), halogenated azoles and their salts.

During those periods when there is no or only a minimal level of corrosion inhibitor, the treatment program may include feeding a secondary corrosion inhibitor composition that may or may not be compatible with the primary corrosion inhibitor. An example of such an alternative dosing regimen is illustrated in FIG. 3, in which the primary corrosion inhibitor is labeled as "Inhibitor I" and the secondary corrosion inhibitor is labeled as "Inhibitor II". As will be appreciated, in those instances in which the secondary corrosion inhibitor is to some degree incompatible with the primary corrosion inhibitor, the concentration of the secondary corrosion inhibitor would be reduced before the next "slug" or "pulse" treatment is applied to the treated system.

As shown in FIG. 3, the application of the secondary inhibitor is controlled to increase in response to a decrease in the primary inhibitor, which is decreased in response to the decrease in surface demand. In this embodiment, the secondary inhibitor concentration flattens out at about 2 ppm after the surface demand is stabilized by the primary inhibitor.

The secondary corrosion inhibitor may include, for example, one or more of unsaturated carboxylic acid polymers such as polyacrylic acid, homo or co-polymaleic acid (synthesized from solvent and aqueous routes); acrylate/2-acrylamido-2-methylpropane sulfonic acid (APMS) copolymers, acrylate/acrylamide copolymers, acrylate homopolymers, terpolymers of carboxylate/sulfonate/maleate, terpolymers of acrylic acid/AMPS; phosphonates and phosphinates such as 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxyphosphonocarboxylic acid (HPA), diethylenetri-amine penta(methylene phosphonic acid) (DETPMP), phosphinosuccinic oligomer (PSO); salts of molybdenum and tungsten including, for example, nitrates and nitrites; amines such as N,N-diethylhydroxylamine (DEHA), diethyl amino ethanol (DEAE), dimethylethanolamine (DMAE), cyclohexylamine, morpholine, monoethanolamine (MEA); azoles such as tolyltriazole (TTA), benzotriazole (BZT), butylbenzotriazole (BBT), halogenated azoles and their salts.

Preliminary testing using mild steel coupons suggests that a stannous treatment concentration of about 3 ppm for a treatment period of about 12 hours was sufficient to reduce corrosion by at least 75% in coupons subsequently exposed to 50° C. municipal water for at least 72 hours. The protective effects of the treatment were seen even in the absence of any residual stannous during the corrosion testing although residual stannous levels of 0.1 ppm and 0.2 ppm did exhibit some minor improvement.

Additional preliminary testing using mild steel coupons suggests that a stannous treatment concentration of 3 ppm was able to achieve maximum protection at some point between 4 and 6 hours with additional treatment beyond that showing little or no improvement in the corrosion inhibition results.

The following Examples illustrate applications of the methods disclosed herein.

Example 1

In the first example, four samples, A, B, C and D, were tested. Each sample tested a corrosive mild steel coupon. Sample A was a blank run without any corrosion inhibitor but the test solution contains the scale inhibitor and a dispersant. Sample B was just the maintenance dose of 0.2 ppm of active Tin corrosion inhibitor in combination with a scale inhibitor and a dispersant. Sample B was not shot fed with the inhibitor. Sample C was initially shot fed with 3 ppm active Tin corrosion inhibitor for 4 hours and then transferred to fresh test solution. Initially, this fresh test solution had no inhibitor but was service dosed with 0.2 ppm active Tin inhibitor at the end of third day. This test solution always had a scale inhibitor and a dispersant. Sample D was initially shot fed with 3 ppm active Tin corrosion inhibitor for 4 hours and then transferred to fresh test solution without any corrosion inhibitor, but containing a scale inhibitor and a dispersant. Typical water chemistry used for all these studies included 200 ppm calcium hardness as CaCO3, 100 ppm magnesium hardness as MgCO3, 150 ppm M-alkalinity as CaCO3, 50 ppm silica as SiO2, 150 ppm chlorides and pH of 8.4

| Sample | Shot Dose (Passivation) | Service Dose (Maintenance) |
|---|---|---|
| A | None | No corrosion inhibitor; contains scale inhibitor and dispersant |
| B | None | Maintenance dose of 0.2 ppm active Tin corrosion inhibitor; contains scale inhibitor and dispersant |
| C | In 3 ppm active Tin corrosion inhibitor for 4 hours | Initially no corrosion inhibitor, but was service dosed with 0.2 ppm active Tin corrosion inhibitor at the end of $3^{rd}$ day; contains scale inhibitor and dispersant |
| D | In 3 ppm active Tin corrosion inhibitor for 4 hours | No corrosion inhibitor; contains scale inhibitor and dispersant |

Figure 4:
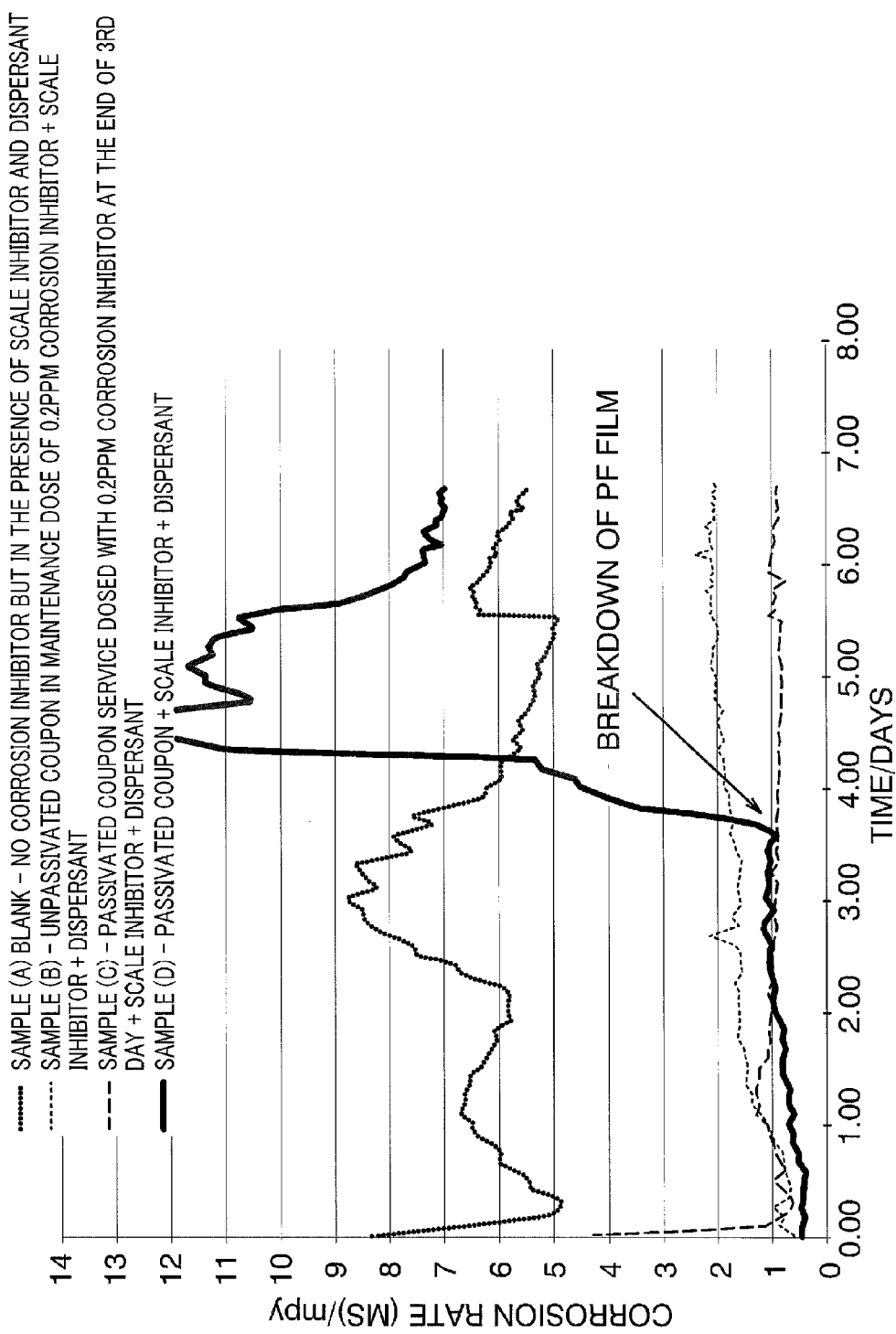
FIG. 4 is a graph illustrating corrosion rates for samples exposed to various treatment methods according to embodiments.

These results are illustrated in FIG. 4, which plots electrochemical corrosion rate of the coupon, which is measured on the y-axis in milli-inch per year (mpy) units against time (days) measured on the x-axis. Generally high corrosion rates ranging from about 5 mpy to about 9 mpy are observed for the control sample (Sample A). Under similar conditions, the passivated (by means of shot feeding) Sample D was treated with a blank service dose that contained no corrosion inhibitor. Sample D shows that the corrosive protection of the initial shot dose lasts about 4 days before the breakdown of the passive film on the corrosive surface of the coupon. After 4 days, the corrosion rate of Sample D accelerates markedly before stabilizing at a rate similar to control Sample A. This indicates that the stable corrosion inhibitor film lasts about four days without any further corrosion inhibitor present in the system. This time period could be different for different systems and surfaces.

Sample B (unpassivated) and Sample C (passivated) were both treated with the same continuous service dose (0.2 ppm). In contrast to Sample D, the continuously dosed unpassivated Sample B retains a relatively low corrosion rate past day 4 and onto day 7 suggesting that the continuous dose has a substantial anti-corrosive effect by a film forming mechanism of the corrosion inhibitor. Sample C also exhibits a lower corrosion rate than Sample D after day 4 and onto day 7. However, passivated (shot-dosed) and service dosed Sample C significantly outperforms continuously dosed Sample B after day 1 and through and beyond day 4. This demonstrates the beneficial anti-corrosive effect of the shot-dosed treatment alone (days 1-4), and in combination with the service-dosed treatment, as shown in the widening gap between Samples B and C after day 4.

Example 2

Table 1 below depicts results from a second example testing four samples, E, F, G and H, on mild steel coupons. Water chemistry used for this study was similar to the one described in EXAMPLE 1. All the tests contain a scale inhibitor and a dispersant at the same concentration levels.

| Test | Treatment | Active Tin Dosage (ppm) | Specimen Type | AVG CORROSION RATE (mpy) |
|---|---|---|---|---|
| E | Shot Fed for 12 hours Service dosage For Pasivation | 3 0 | Mild Steel | 0.94 |
| F | Shot Fed for 12 hours Service dosage | 3 0.1 | Mild Steel | 0.77 |
| G | Shot Fed for 12 hours Service dosage | 3 0.2 | Mild Steel | 0.82 |
| H | No Shot Feeding Continuous maintenance dosage | 0 0.2 | Mild Steel | 4.30 |

Samples E, F and G were shot-dosed (passivated) with 3 ppm active Tin corrosion inhibitor for 12 hours. Sample H, the control, was not passivated but a continuous dosage of corrosion inhibitor was maintained. All samples were transferred after shot dosing to a treatment bath (service dose) with no inhibitor (Sample E), 0.1 ppm inhibitor (Sample F) and 0.2 ppm inhibitor (Samples G and H). Three days after the service dose treatment, the coupons were examined for corrosion. Sample H exhibited a high corrosion rate of 4.3 despite being continuously dose treated. Samples E, F and G exhibited respective corrosion rates of 0.94, 0.77, and 0.82. These results suggest that treatment with a shot dose of Tin corrosion inhibitor before service dosing allows for lower required Tin concentrations in the treatment solution.

Example 3

Table 2 below depicts results from a third example testing four samples, Samples I, J, K and L, on mild steel coupons. These tests were aimed at determining the effect of shot feed times on the corrosion rates. Water chemistry used was similar to the one described in EXAMPLE 1.

| Test | Treatment | Active Tin Dosage (ppm) | Specimen Type | AVG CORROSION RATE (mpy) |
|---|---|---|---|---|
| I | Shot dosed for 2 hours Service dose | 3 0.1 | Mild Steel | 4.40 |
| J | Shot dosed for 4 hours Service dose | 3 0.1 | Mild Steel | 2.23 |
| K | Shot dosed for 6 hours Service dose | 3 0.1 | Mild Steel | 1.81 |
| L | Shot dosed for 20 hours Service dose | 3 0.1 | Mild Steel | 1.80 |

All samples were shot-dosed (passivated) with 3 ppm active Tin(II). As shown in FIG. 6, Samples I, J, K and L were passivated for 2, 4, 6 and 20 hours, respectively. Corrosion rates for 2 hours (Sample I), 4 hours (Sample J), 6 hours (Sample K) and 20 hours (Sample L) were 4.40, 2.23, 1.81 and 1.80, respectively. These data show that corrosion rates vary inversely with passivation time such that longer passivation times result in lower corrosion rates up to point when diminishing marginal impact is observed. For example, there is a 49.3% reduction in corrosion rate from passivation time period 2 to 4 hours, while there is only 0.01% reduction from 6 hours to 20 hours.

Example 4

Figure 5:
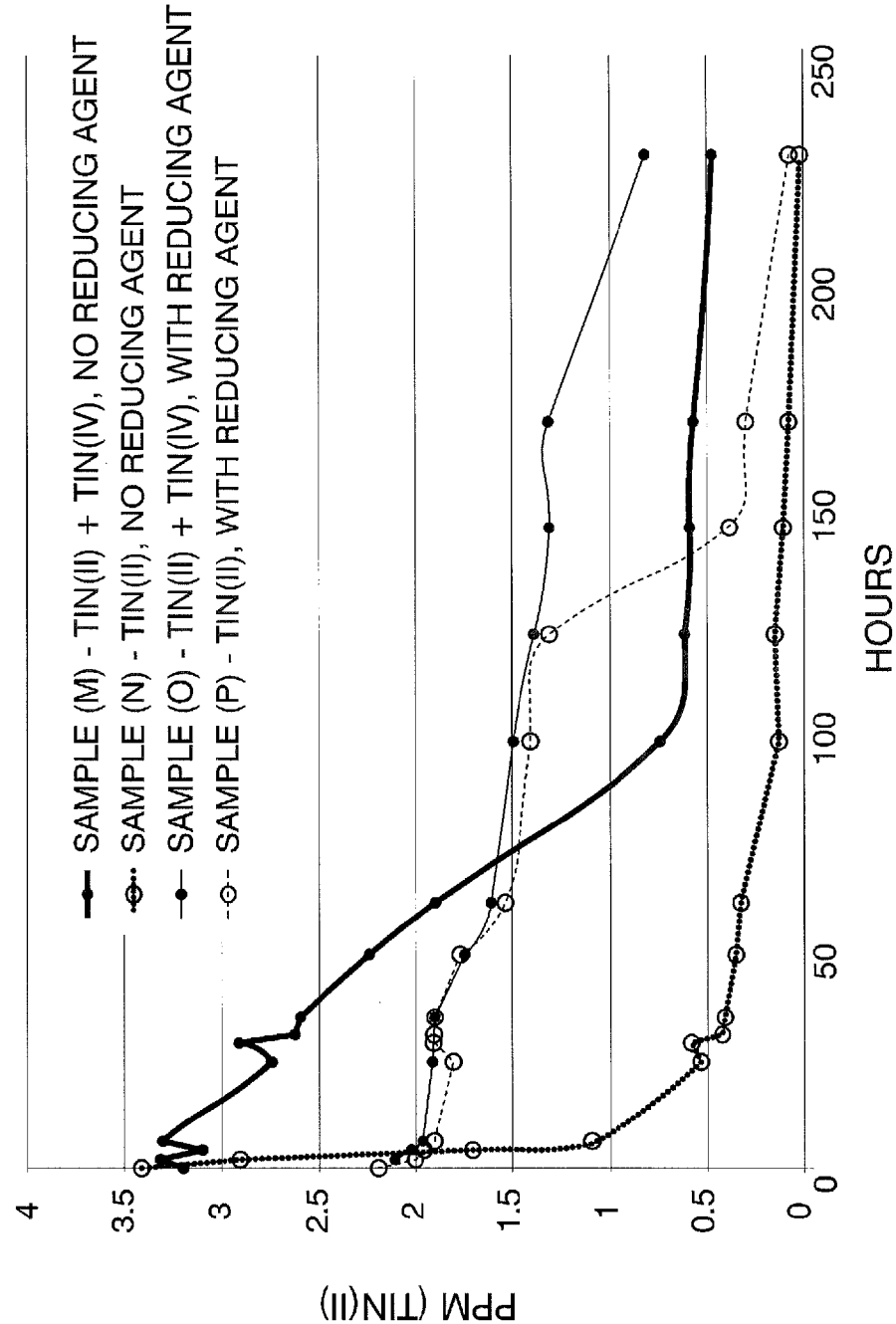
FIG. 5 is a graph illustrating the concentrations of various corrosion inhibitors in a water system over time.

FIG. 5 depicts analytical results from a fourth example on the effect of reducing agents in keeping the active Tin (II) in solution for long periods of time. This data is important for the shot feed/service feed concept to work. Tests results for the samples M, N, O and P, are given in FIG. 5. All samples were service-dosed with Tin (II) at time zero. The y-axis measures the concentration of Total Tin, (Samples M and O), or Active Tin, Tin(II), which includes only Tin(II) (Samples N and P). Samples O and P both also included a reducing agent in the treatment solution, while Samples M and N did not (see legend of FIG. 5). As seen in FIG. 5, Sample P with the reducing agent maintains a higher concentration of Active Tin (II), 125 hours after the service dose, as compared to Sample N, which measures Active Tin (II) in the absence of reducing agent. These data indicate that a reducing agent additive to the treatment solution can maintain higher concentrations of Tin (II), the active oxidation state for developing a protective film on surface of the coupon and inhibiting corrosion, for longer periods of time.

Example 5

Table 3, below, depicts results from a fifth example with two pilot cooling tower (PCT) studies PCT2 and PCT3, in a live cooling water system. PCT 2 was initially shot dosed with 1.5 ppm of active Tin (II) and there was no subsequent dose of the corrosion inhibitor. PCT 3 was shot dosed with 3 ppm active Tin (II) and service dosed with 1.5 ppm active Tin (II) on $10^{th}$ day.

Pilot Cooling Tower Data

Results:
PCT2:
  Tower shot dosed with 1.5 ppm Active Tin(II) on May 13, 2013 and no further addition of corrosion inhibitor
  Coupon 0873 added May 13, 2013    Corrosion rate 0.486 after 10 days
  Coupon 0585 added May 23, 2013    Corrosion rate 1.132 after 10 days
    $2^{nd}$ coupon corrosion was 57% higher than $1^{st}$ coupon indicating the loss of active Tin (II) during first 10 days and hence increase in corrosion rates with the subsequent coupons
PCT3:
  Tower dosed to 200 ppm on May 13, 2013 and a service dose of 1.5 ppm active Tin (II) was given on the May 23, 2013 before inserting the second coupons on the same day.
  Coupon 0589 added May 13, 2013    Corrosion rate 0.732 mpy
  Tower serviced dosed with 100 ppm on May 23, 2013
  Coupon 0590 added May 23, 2013    Corrosion rate 0.790 mpy
    $2^{nd}$ coupon corrosion was almost same as the $1^{st}$ coupon PCT2 tested two samples, Coupon 0873 and Coupon 0585. The PCT2 cooling tower was shot-dosed with 100 ppm PF on May 13, 2013. Subsequently no further addition of corrosion inhibitor was made. Coupon 0873 was added the same day and evaluated for corrosion rate on May 23, 2013. The 10 day corrosion rate on Coupon #0585 was found to be 0.486 mpy. A fresh coupon 0585 was added on May 23, 2013 and evaluated for 10 day corrosion and found to be 1.132. The corrosion rate of the later added Coupon 0585 was about 57% higher than the earlier added Coupon 0873 suggesting that the corrosion inhibitor had been used up for the passivation of the first coupon. PCT2 demonstrates the need for a good shot dose for maintaining good corrosion rates.

PCT 3 tested two samples, Coupon 0589 and Coupon 0590. The PCT3 cooling tower was shot dosed with 200 ppm PF on May 13, 2013 and service dosed with 100 ppm PF on May 23, 2013. First coupon (Coupon 0589) was added just before the 200 ppm shot feed on May 13, 2013 and the 10 day corrosion rate on this coupon was 0.732 mpy. The cooling tower was service dosed with 1.5 ppm of active Tin (II) on May 23, 2013 and a fresh coupon (Coupon 0590) was added right after the service dose. The 10 day corrosion rate on Coupon 0590 was 0.790, which is almost identical to the corrosion rate on the first coupon. The results of PCT3 illustrate the beneficial effects of shot dosing and service dosing for maintaining an effective amount of corrosion inhibitor in the cooling tower.

Example 6

FIG. 6 illustrates a sixth example examining the chemical composition of a passivated mild steel coupon. X-ray photoelectron spectroscopy (XPS) reveals the presence of the Tin (IV) film on the metal coupon surface. This demonstrates that that the mechanism of corrosion inhibition is by oxidation of Tin(II) to Tin(IV) and forming an insoluble film on the metal surface of the coupon under these test conditions. The peak at 487 eV corresponds to Tin in the (IV) oxidation state. Similar XPS analysis was conducted on a various other metals and alloys such as, but not limited to, copper, brass, aluminum, galvanized steel, etc coupon and results were confirmed.

It will be appreciated that the above-disclosed features and functions, or alternatives thereof, may be desirably combined into different systems or methods. Also, various alternatives, modifications, variations or improvements may be subsequently made by those skilled in the art, and are also intended to be encompassed by the following claims. As such, various changes may be made without departing from the spirit and scope of this disclosure as defined in the claims.

What is claimed is:

1. A method of suppressing corrosion of a corrodible metal surface that contacts a water stream in a water system, the method comprising:
  (a) introducing into the water stream a shot dose of a treatment composition comprising a corrosion inhibitor in amounts sufficient to provide a stable film of Tin(IV) on the metal surface, the shot dose being introduced into the water stream over a first time period and the water stream having a first concentration of corrosion inhibitor during the first time period;
  (b) then reducing the amount of treatment composition that is introduced into the water stream;
  (c) after the first time period, maintaining a second concentration of corrosion inhibitor in the water stream over a second time period, the second concentration being less than 25% of the concentration of corrosion inhibitor during the first time period; and
  (d) then increasing the amount of treatment composition that is introduced into the water stream during a third time period at a third concentration that is higher than the second concentration and is in the range of 20 to 100% of the first concentration, the third concentration being sufficient to maintain or re-stabilize portions of the stable film of Tin(IV) on the metal surface.

2. The method of suppressing corrosion according to claim 1, wherein the corrodible metal surface is a metal or alloy selected from the group consisting of ferrous metals, aluminum metals, brass, copper containing alloys, and galvanized steels.

3. The method of suppressing corrosion according to claim 1, wherein the first time period is in the range of from 5 minutes to 2 days.

4. The method of suppressing corrosion according to claim 1, wherein the first time period is in the range of from 10 minutes to 24 hours.

5. The method of suppressing corrosion according to claim 1, wherein the corrosion inhibitor is Tin(II).

6. The method of suppressing corrosion according to claim 5, wherein the corrosion inhibitor is provided as a stannous salt selected from the group consisting of stannous sulfate, stannous bromide, stannous chloride, stannous oxide, stannous phosphate, stannous pyrophosphate, and stannous tetrafluroborate.

7. The method of suppressing corrosion according to claim 1, wherein the first concentration of the corrosion inhibitor in the water stream during the first time period is from about 0.1 to 1000 ppm.

8. The method of suppressing corrosion according to claim 1, wherein the first concentration of the corrosion inhibitor in the water stream during the first time period is from about 0.5 to 50 ppm.

9. The method of suppressing corrosion according to claim 1, wherein the first concentration of the corrosion inhibitor in the water stream during the first time period is from about 1.5 to 5 ppm.

10. The method of suppressing corrosion according to claim 1, wherein the corrosion inhibitor is provided as a salt in the treatment composition.

11. The method of suppressing corrosion according to claim 1, wherein the treatment composition further comprises a reducing agent selected from the group consisting of erythrobate, glycolic acid or other aliphatic polycarboxylic acid, amine carboxylic acid, phosphonocarboxylic acid, hydroxycarboxylic acids, hydroxyphosphono carboxylic acid based complexing agents, or combinations thereof.

12. The method of suppressing corrosion according to claim 1, wherein the treatment composition includes at least one of a chelating agent, scale inhibitor, and dispersant.

13. The method of suppressing corrosion according to claim 1, wherein the second concentration of corrosion inhibitor in the water stream during the second time period is zero or substantially zero.

14. The method of suppressing corrosion according to claim 1, wherein the second concentration of corrosion inhibitor in the water stream during the second time period is from about 0.01 ppm to 2 ppm.

15. The method of suppressing corrosion according to claim 1, wherein the second concentration of corrosion inhibitor in the water stream during the second time period is from about 0.1 ppm to 0.5 ppm.

16. The method of suppressing corrosion according to claim 1, further comprising introducing a secondary corrosion inhibitor with the shot dose, after the shot dose and/or during the second time period,
wherein the secondary corrosion inhibitor is different from the corrosion inhibitor introduced by the shot dose.

17. The method of suppressing corrosion according to claim 16, wherein the secondary corrosion inhibitor is selected from the group consisting of compounds producing metal ions with multiple oxidation states, ortho phosphates, pyro phosphates, zinc, molybdates, nitrites, hydroxycarboxylic acids, unsaturated carboxylic acid polymers, acrylate/2-acrylamido-2-methylpropane sulfonic acid (APMS) copolymers, acrylate/acrylamide copolymers, acrylate homopolymers, terpolymers of carboxylate/sulfonate/maleate, terpolymers of acrylic acid/AMPS, phosphonates and phosphinates, salts of molybdenum and tungsten, amines, azoles, their salts, and combinations thereof.

18. The method of suppressing corrosion according to claim 1, further comprising:
(e) measuring a parameter of the metal surface or water stream,
(f) introducing into the water stream a second shot dose including the corrosion inhibitor during the third time period,
wherein the timing of introducing the second shot dose is controlled based on the measured parameter.

19. A method of suppressing corrosion of a corrodible metal surface that contacts a water stream in a water system, the method comprising:
(a) introducing into the water stream a first shot dose of corrosion inhibitor in amounts sufficient to provide a stable film of Tin(IV) on the metal surface, the first shot dose being introduced into the water stream over a first time period and the water stream having a first concentration of corrosion inhibitor during the first time period;
(b) after the first time period, maintaining a second concentration of corrosion inhibitor in the water stream over a second time period, the second concentration being less than 25% of the concentration of corrosion inhibitor during the first time period; and
(c) after the second time period, introducing into the water stream a second shot dose of the corrosion inhibitor over a third time period and at a third concentration greater than the second concentration, the third concentration being sufficient to maintain or re-stabilize portions of the stable film of Tin(IV) on the metal surface.

20. The method of suppressing corrosion according to claim 19, wherein the third concentration is less than the first concentration.

21. The method of suppressing corrosion according to claim 19, wherein the second time period is the same duration as the first time period.

22. The method of suppressing corrosion according to claim 19, wherein the second concentration of corrosion inhibitor is zero or substantially zero.

23. The method of suppressing corrosion according to claim 19, wherein the concentration of corrosion inhibitor during the third time period is from 5 to 100% of the first concentration of corrosion inhibitor.

24. The method of suppressing corrosion according to claim 19, wherein the concentration of corrosion inhibitor during the third time period is from 10 to 20% of the first concentration of corrosion inhibitor.

25. The method of suppressing corrosion according to claim 19, wherein the second shot dose further includes a reducing agent.

26. The method of suppressing corrosion according to claim 25, wherein the first shot dose does not include a reducing agent.

27. The method of suppressing corrosion according to claim 26, wherein the reducing agent is selected from the group consisting of erythrobate, glycolic acid or other aliphatic polycarboxylic acid, amine carboxylic acid, phosphonocarboxylic acid, hydroxycarboxylic acids, hydroxyphosphono carboxylic acid based complexing agents, and combinations thereof.

28. The method of suppressing corrosion according to claim 19, wherein the third concentration of corrosion inhibitor is in the range of from about 0.1 to 1000 ppm.

29. The method of suppressing corrosion according to claim 19, wherein the third concentration of corrosion inhibitor is in the range of from about 0.5 to 50 ppm.

30. The method of suppressing corrosion according to claim 19, wherein the third concentration of corrosion inhibitor is in the range of from about 1.5 to 5 ppm.

31. The method of suppressing corrosion according to claim 19, further comprising periodically and intermittently feeding a shot dose of the corrosion inhibitor into the water system.

32. The method of suppressing corrosion according to claim 31, wherein the time between the periodic and intermittent shot doses is from about 2 to 30 days.

33. The method of suppressing corrosion according to claim 31, wherein the time between the periodic and intermittent shot doses is from about 3 to 7 days.

34. The method of suppressing corrosion according to claim 19, further comprising:
(d) measuring a parameter of the metal surface or water stream.

35. The method of suppressing corrosion according to claim 34, wherein the timing of introducing the second shot dose is controlled based on the measured parameter.

36. The method of suppressing corrosion according to claim 34, wherein the measured parameter is a surface or system parameter, which are indicative of a system demand or surface demand of the inhibitor.

37. The method of suppressing corrosion according to claim 34, wherein the frequency and/or duration of the second shot dose is controlled based on the measured parameter.

38. The method of suppressing corrosion according to claim 34, wherein the measured parameter is at least one of online corrosion rates, water chemistry, concentration of oxidizing species in water, and oxidation reduction potential.

39. The method of suppressing corrosion according to claim 1, wherein the water system includes, but is not limited to, cooling towers, water distribution systems, boilers, water/brine carrying pipelines, storage tanks and the like.

40. The method of suppressing corrosion according to claim 1, wherein the second concentration is in the range of 3.3% to 6.7% of the concentration of corrosion inhibitor during the first time period.

41. The method of suppressing corrosion according to claim 19, wherein the second concentration is in the range of 3.3% to 6.7% of the concentration of corrosion inhibitor during the first time period.

* * * * *